United States Patent
McLain

(10) Patent No.: US 6,292,968 B1
(45) Date of Patent: Sep. 25, 2001

(54) ARTICULATED BRIDGE

(76) Inventor: Perry E. McLain, 2707 Justin Woods, Cameron Park, CA (US) 95682

( * ) Notice: Subject to any disclaimer, the term of this patent is extended or adjusted under 35 U.S.C. 154(b) by 0 days.

(21) Appl. No.: 09/412,104

(22) Filed: Oct. 4, 1999

Related U.S. Application Data

(60) Provisional application No. 60/153,285, filed on Sep. 10, 1999.

(51) Int. Cl.[7] ............................. E01D 1/00; E01D 19/04
(52) U.S. Cl. .......................... 14/71.1; 14/69.5; 104/31; 104/458
(58) Field of Search ..................... 14/2.4, 27, 69.5, 14/70, 71.1, 73.5, 78, 73; 52/7, 9, 167.1, 393; 104/20, 31, 53, 58, 63; 105/8.1, 10, 425, 449, 458; 114/230.1; 405/202, 218; 472/28, 130; 198/325, 328, 850; 248/687, 581, 616

(56) References Cited

U.S. PATENT DOCUMENTS

| | | | |
|---|---|---|---|
| 2,641,785 | * 6/1953 | Pitts et al. | 14/71.1 |
| 3,296,638 | * 1/1967 | Morlon | 14/73.5 |
| 3,563,616 | 2/1971 | Allen | 308/6 |
| 3,577,659 | * 5/1971 | Kail | 35/12 |
| 3,658,231 | 4/1972 | Gilman | 228/4 |
| 4,011,615 | * 3/1977 | Maxson et al. | 14/71.1 |
| 4,059,360 | 11/1977 | Teissier | 403/2 |
| 4,120,066 | * 10/1978 | Leroux | 14/16.5 |
| 4,153,152 | * 5/1979 | Lapeyre | 198/851 |
| 4,557,082 | 12/1985 | Dunsworth | 52/109 |
| 4,590,634 | * 5/1986 | Williams | 14/71.1 |
| 4,802,417 | * 2/1989 | Kuker et al. | 105/8.1 |
| 5,010,614 | * 4/1991 | Braemert et al. | 14/71.1 |
| 5,161,104 | * 11/1992 | Fox et al. | 364/410 |
| 5,263,217 | * 11/1993 | Miglietti | 14/32 |
| 5,277,662 | 1/1994 | Fox et al. | 472/136 |
| 5,302,050 | * 4/1994 | Buckenauer et al. | 404/53 |
| 5,537,790 | * 7/1996 | Jackson | 52/393 |
| 5,568,993 | * 10/1996 | Potzick | 403/128 |
| 5,597,240 | 1/1997 | Fyfe | 384/36 |
| 5,711,670 | 1/1998 | Barr | 434/55 |
| 5,771,812 | 6/1998 | Britzke | 105/458 |
| 5,799,456 | * 9/1998 | Shreiner et al. | 52/396.04 |
| 6,022,169 | * 2/2000 | Kim et al. | 404/52 |
| 6,131,224 | * 10/2000 | Bernal | 14/69.5 |

FOREIGN PATENT DOCUMENTS 2 156 743-A * 10/1985 (GB).

* cited by examiner

Primary Examiner—Thomas B. Will
Assistant Examiner—Gary S. Hartmann
(74) Attorney, Agent, or Firm—Flehr Hohbach Test Albritton & Herbert LLP

(57) ABSTRACT

An apparatus and method are provided for joining a first structure to a second structure. In one embodiment, a bridge 100 is provided for joining a movable structure 105 to a fixed structure 110. The bridge 100 includes a number of spaced apart extensible beams 115, each beam having a first end 125 pivotably and rotatably attached to the movable structure 105 and a second end 130 pivotably and rotatably attached to the fixed structure 110. Deck members 135 are supported by the extensible beams 115 in a substantially horizontal attitude, each of the deck members pivotably and rotatably attached to one of the beams whereby access is provided between the movable structure 105 and the fixed structure 110. In one version, the movable structure 105 includes a vehicle, such as a train, an automobile, a watercraft, an aircraft or a spacecraft. In another version, the movable structure 105 is a motion-base 230 of a simulator, amusement ride or a theater 235.

23 Claims, 8 Drawing Sheets

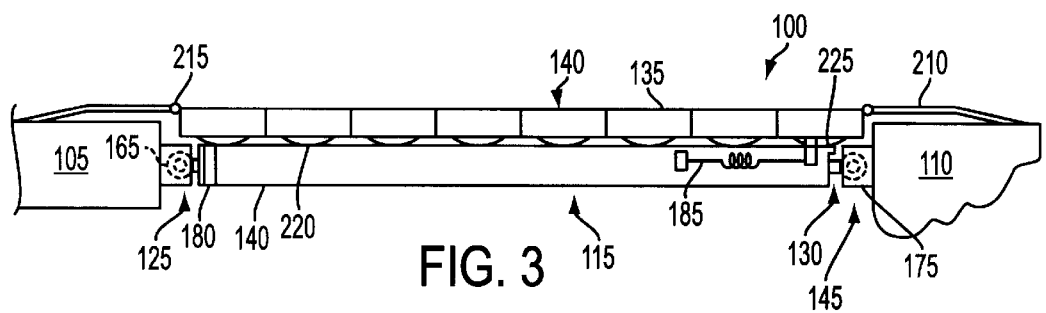
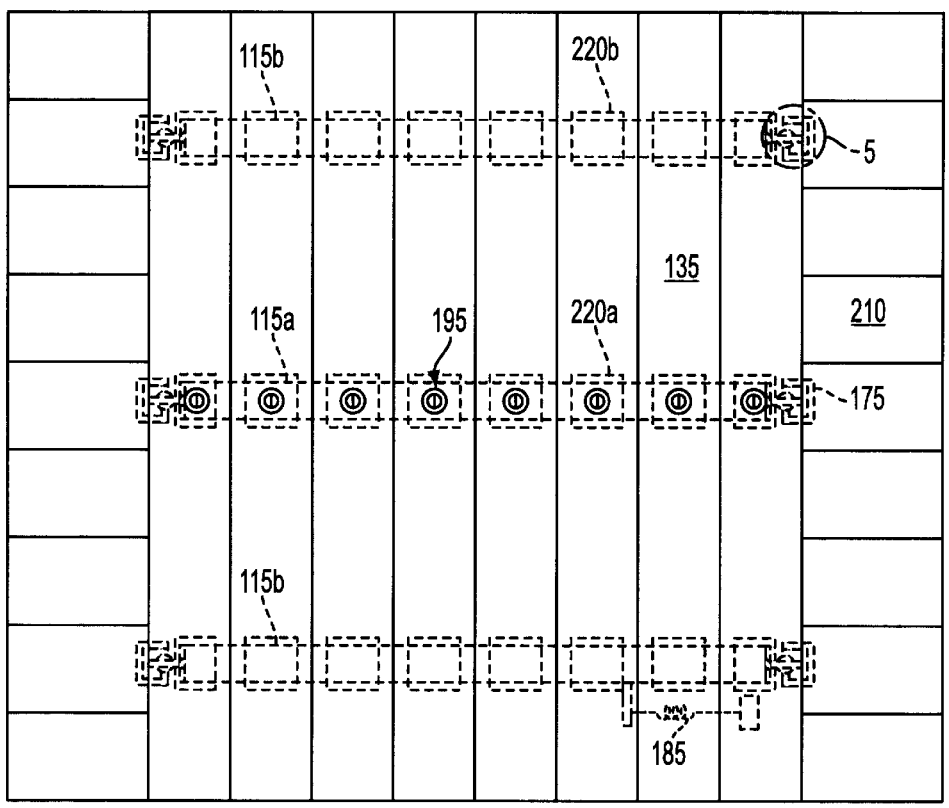
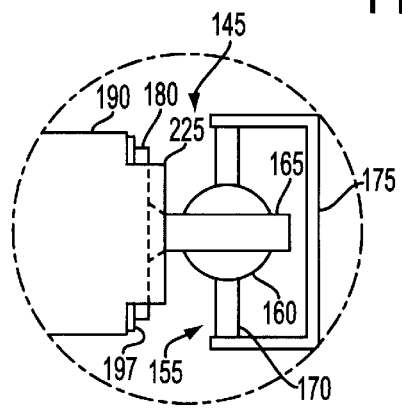
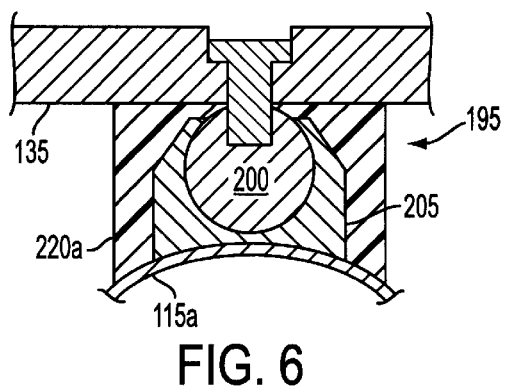

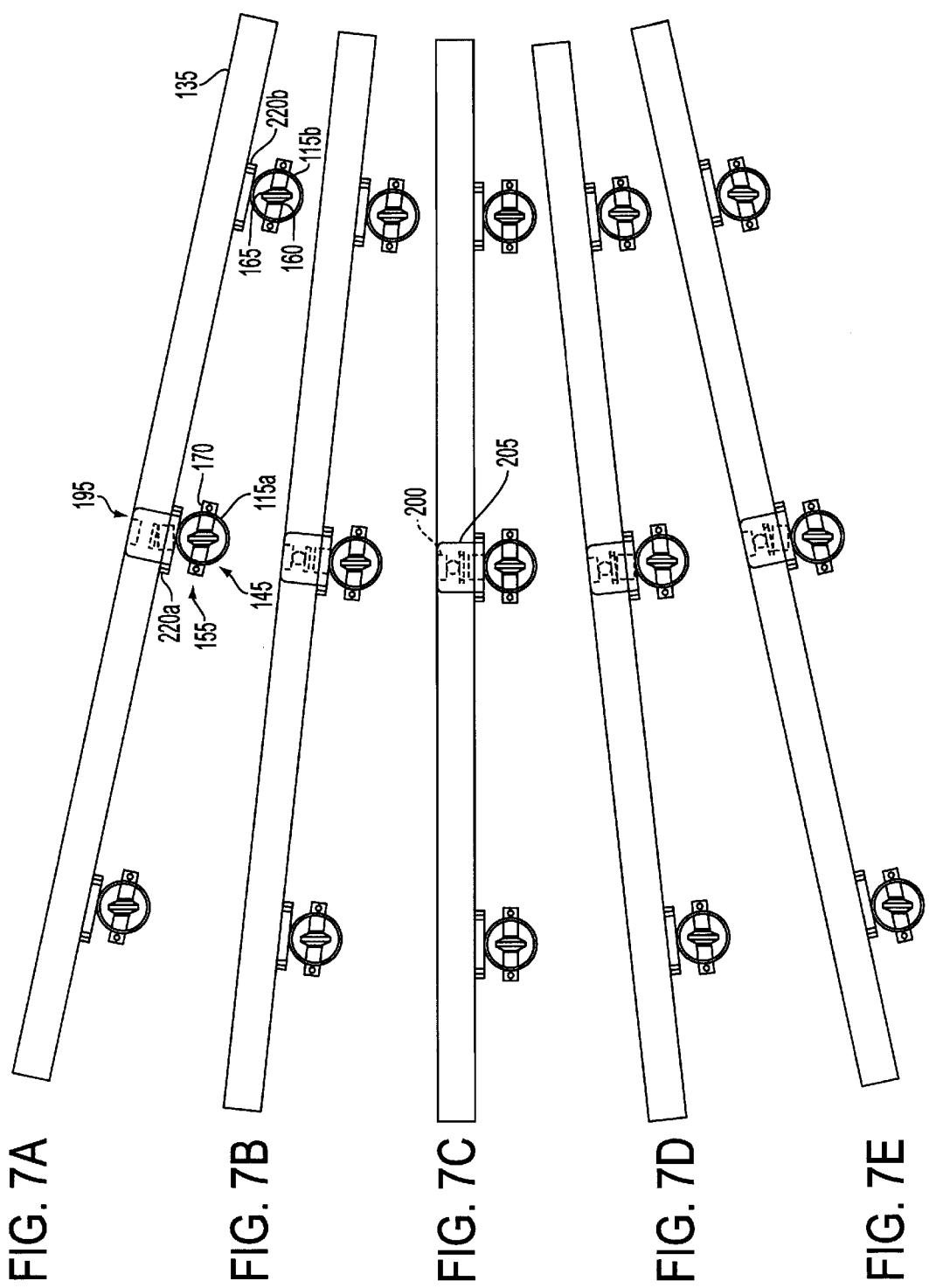

ARTICULATED BRIDGE

CROSS REFERENCE TO RELATED APPLICATIONS

This application claims priority from U.S. Provisional patent application Ser. No. 60/153,285 entitled Articulated Bridge, filed Sep. 10, 1999.

FIELD OF THE INVENTION

This invention relates generally to the field of bridges, and more particularly to an apparatus and method for joining a movable structure to a fixed structure

BACKGROUND OF THE INVENTION

There are many applications in which it is necessary or desirable to join a movable structure to a fixed structure to provide access to the movable structure while allowing movement of the movable structure relative to the fixed structure. For example, it is often necessary to provide access between a ship and a pier or an aircraft and an airport terminal. This is particularly a problem for motion-bases that typically include a "base" or platform that can provide for six degrees of freedom of motion including roll, pitch, yaw, vertical, lateral and longitudinal motion. Motion-bases are widely used in devices such as vehicle simulators, amusement rides and interactive theaters which move in synchronization with images projected on a screen to create the illusion of riding in a particular vehicle.

It will be readily appreciated that the complex movement of the motion-base makes it impossible to use rigid bridges having fixed dimensions and orientation to join it to a fixed structure. Moreover, a bridge or gangway that is not anchored at one end but in sliding engagement with the motion-base or the fixed structure, such as a brow joining a ship to a pier, is also generally not satisfactory because it cannot allow for simultaneous rotation about or movement along multiple axes. For example, while a ship's brow is frequently made to allow for some lateral motion away from and toward the pier, and may even be hinged to allow for moderate rolling motion, it would not allow for a pitching motion that would cause opposite sides of the brow to lift alternately. Thus, prior art solutions for providing ingress and egress to a motion-base while allowing it to move relative to a fixed structure have focused on movable ramps or platforms moved into position after the movement has been stopped to allow access to and from the motion-base.

One proposed solution, shown in FIGS. 1 and 2, utilizes five parallel planks 20 extending from the fixed structure 25 to the motion-base 30 to form a gangway 35. The planks 20 are joined to one another by an tongue-and-groove arrangement 40 that allows adjoining planks to be moved in opposite directions as indicated by arrows 45. Each plank 20 is coupled to either the fixed structure 25 or the motion-base 30 in such a manner that no two adjoining planks are both connected to the same structure. The planks 20 are rigidly connected to the fixed structure 25 through a first bar 50, and are connected to the motion-base 30 through a second bar 55 and a pivot 60. While an improvement over ramps which are manually moved into position this design is not completely satisfactory.

A problem with this approach is it severely limits the freedom of movement of the motion-base 30. In particular, the rigid attachment to the fixed structure 25 prevents the gangway from allowing longitudinal movement of the motion-base in a direction perpendicular to the gangway 35. For the same reason, the gangway 35 does not allow a yawing motion or a purely vertical movement of the motion base 30. This design might allow a limited rolling motion of the motion base 30, provided the roll axis coincides with the axis of the pivot. In fact, the only movement of the motion base 30 that the gangway clearly would allow is a lateral movement towards or away from the fixed structure 25. A further problem with the gangway shown in FIG. 1 and FIG. 2, is the difficulty and expense of forming the tongue and groove arrangement 40. Moreover, this design allows dirt or other foreign objects to fall into the tongue and groove arrangement 40, which can cause the planks 20 to bind and rendering the gangway 35 inoperable.

Another prior art solution, as disclosed in U.S. Pat. No. 5,277,662, to Fox et al., hereby incorporated by reference, use movable platforms pivoted into position to load and unload passengers from a motion-base, here an amusement park ride, and folded away from the motion-base while it is in operation. Although this approach avoids many problems of rigid bridges and sliding gangways, it leads to several additional problems, and therefore is also not completely satisfactory.

One problem with this approach is the added cost and complexity of a controller required to return the motion-base to a precise position relative to the fixed structure. The controller is also needed to synchronize the movement of the platform to that of the motion-base so that the platform is moved into position as soon as the motion-base stops. In addition to the cost, the controller also adds to the maintenance requirements and the potential for malfunctions. Moreover, for many applications, such as an amusement ride, the time delay occasioned by extending or folding away the platform before and after operation of the motion-base is very undesirable.

Another, more serious problem with all such solutions is that the passengers are effectively trapped on the motion-base for the duration of the ride. While many passengers would probably be unaware of this, or at most would be only slightly inconvenienced, in case of fire or a medical emergency the situation could be life-threatening. Moreover, if, as in the reference cited above, the platform is automatically or electronically controlled the problem is exacerbated during a power failure.

Yet another problem with the above approach, is the potential for injury by the movable platform. If the platforms do not couple with the fixed structure or the motion-base closely enough, a passenger can fall through or have a limb or clothing become trapped in the resulting gap.

Accordingly, there is a need for an apparatus and method for joining a movable structure to a fixed structure to provide access to the movable structure while allowing movement of the movable structure relative to the fixed structure. The present invention provides a solution to these and other problems, and offers other advantages over the prior art.

SUMMARY OF THE INVENTION

The present invention provides an apparatus and a method for joining a first structure to a second structure. In one embodiment, the present invention provides a bridge for joining a movable structure to a fixed structure. The bridge includes a number of spaced apart extensible beams, each extensible beam having a first end pivotably and rotatably attached to the movable structure and a second end pivotably and rotatably attached to the fixed structure. A number of deck members are supported above and by the extensible beams in a substantially horizontal attitude, each of the deck members pivotably and rotatably attached to one of the extensible beams to provide ingress and egress to the movable structure. In one version, the movable structure is a vehicle, and the first ends of each of the extensible beams are releasably attached to the vehicle. The vehicle can be a train, an automobile, a watercraft, an aircraft, or a spacecraft.

In another embodiment the present invention is directed to a bridge for joining a motion-base to a fixed structure to provide ingress and egress to the motion-base. The bridge includes three spaced apart, extensible beams including a central extensible beam and two outer extensible beams, one on each side of the central extensible beam. Each extensible beam has a first end pivotably and rotatably attached by a spherical-swivel-joint to the motion-base and a second end pivotably and rotatably attached by a spherical-swivel-joint to the fixed structure. Deck members are supported above and by the extensible beams in a substantially horizontal attitude, each deck member is pivotably and rotatably attached by a ball-socket-joint to the central extensible beam and in sliding contact with the outer extensible beams. Optionally, each of the deck members further includes several pads of material having a low coefficient of friction between the deck member and the extensible beams. Preferably, the extensible beams include a first beam member in slidable engagement with a second beam member. More preferably, the first beam member telescopes into the second beam member. The extensible beams can further include one or more bearings inside the second beam member and in between the first beam member and the second beam member to ease the telescoping of the first member into the second beam member. Alternatively, a sleeve of material having a low coefficient of friction is placed inside the second beam member and between the first beam member and the second beam member to ease the telescoping of the first member into the second beam member.

In another aspect, the invention is directed to a method of joining a movable structure to a fixed structure. In the method, a number of extensible beams having first ends and second ends are provided. The first ends of the extensible beams are pivotably and rotatably attached to the movable structure, and the second ends are pivotably and rotatably attached to the fixed structure. Several deck members are pivotably and rotatably attached to one of the extensible beams so that the deck is supported above and by the extensible beams in a substantially horizontal attitude. Preferably, the step of attaching the first and second ends of the extensible beams includes the step of attaching the extensible beams to provide a central extensible beam and at least two other extensible beams laterally spaced apart from the central extensible beam on either side of the central extensible beam. More preferably, the step of pivotably and rotatably attaching each of the deck members to one of the extensible beams includes the step of attaching the deck members to the central extensible beam.

In yet another aspect, the invention is directed to a theater comprising a motion-base to provide patrons of the theater with a sense of riding in a vehicle, such as, for example, a submarine. The motion-base includes a number of actuators to move the motion-base through six degrees of freedom of motion. The theater also includes a bridge to provide ingress and egress to the motion-base from a fixed structure surrounding the motion-base while enabling movement of the motion-base relative to the fixed structure. The bridge has several spaced apart extensible beams, each extensible beam having a first end pivotably and rotatably attached to the motion-base and a second end pivotably and rotatably attached to the fixed structure. Several deck members are supported above and by the extensible beams in a substantially horizontal attitude, each of the deck members is pivotably and rotatably attached to one of the extensible beams. Preferably, the bridge has three spaced apart, extensible beams including a central extensible beam and two outer extensible beams, one on each side of the central extensible beam. More preferably, the deck members pivotably and rotatably attach to the central extensible beam and are in sliding contact with the outer extensible beams.

In still another aspect, the invention is directed to a bridge for joining a first substantially fixed structure to a second substantially fixed structure to enable movement of the first structure relative to the second structure. The bridge includes a number of spaced apart, extensible beams, each extensible beam having a first end pivotably and rotatably attached to the first structure and a second end pivotably and rotatably attached to the second structure. Deck members are supported above and by the extensible beams in a substantially horizontal attitude, each of the deck members is pivotably and rotatably attached to one of the extensible beams. In one embodiment, the first and second structures include adjacent buildings, and the movement of the first structure relative to the second structure is due to thermal expansion, seismic forces or wind.

BRIEF DESCRIPTION OF THE DRAWINGS

These and various other features and advantages of the present invention will be apparent upon reading of the following detailed description in conjunction with the accompanying drawings, where:

FIG. 3 is a side view of an embodiment of a bridge for joining a movable structure to a fixed structure according to the present invention;

FIG. 4 is a top view of the articulated bridge of FIG. 3;

FIG. 5 is a partial view of the articulated bridge of FIG. 4 showing the spherical-swivel joint;

FIG. 6 is a partial sectional view showing an embodiment of a ball-socket-join of a bridge according to the present invention;

FIGS. 7a to 7e are schematic views of an embodiment of a bridge according to the present invention showing movement of one end of the bridge;

DETAILED DESCRIPTION

Figure 1:
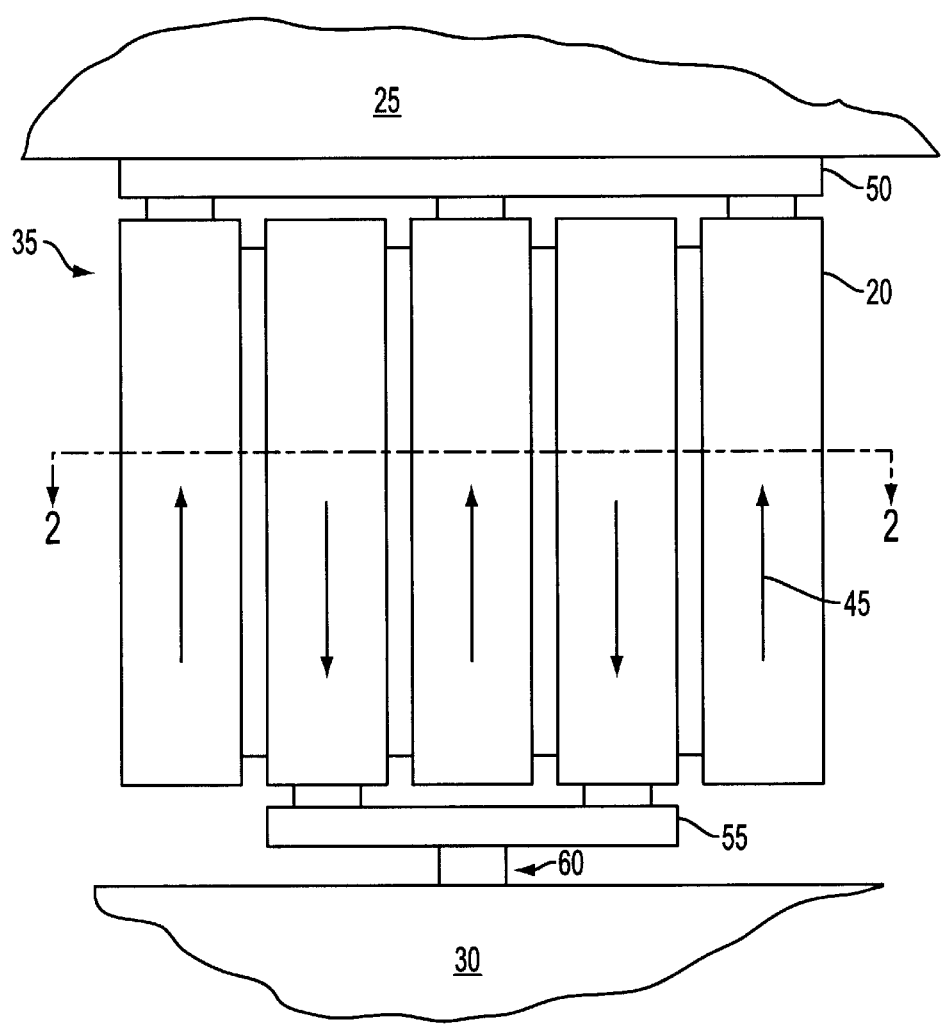
FIG. 1 (prior art) is a top view of a gangway for joining a movable structure to a fixed structure.
Figure 2:
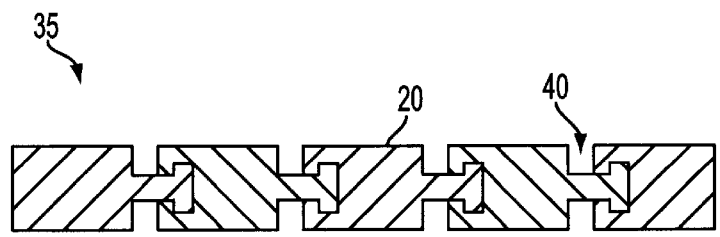
FIG. 2 (prior art) is a sectional side view of the articulated bridge of FIG. 1.

The present invention is directed to an apparatus and method for joining a first structure to a second structure. In one embodiment, shown in FIGS. 3, 4, a bridge 100 is provided for joining a movable structure 105 to a fixed structure 110. The bridge 100 includes a number of spaced apart extensible beams 115, (singularly 115a, 115b) each extensible beam having a first end 125 pivotably and rotatably attached to the movable structure 105 and a second end 130 pivotably and rotatably attached to the fixed structure 110. A number of deck members 135 are supported above and by the extensible beams 115 in a substantially horizontal attitude, each of the deck members 135 pivotably and rotatably attached to one of the extensible beams 115, so that access is provided between the movable structure 105 and the fixed structure 110 while enabling movement of the movable structure relative to the fixed structure.

Figure 13:
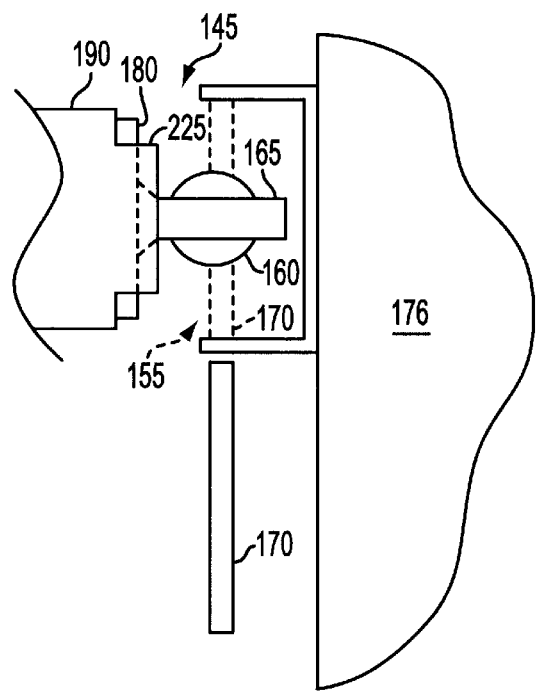
FIG. 13 is partial view showing an embodiment of a bridge according to the present invention for joining a vehicle to a fixed structure.
Figure 14:
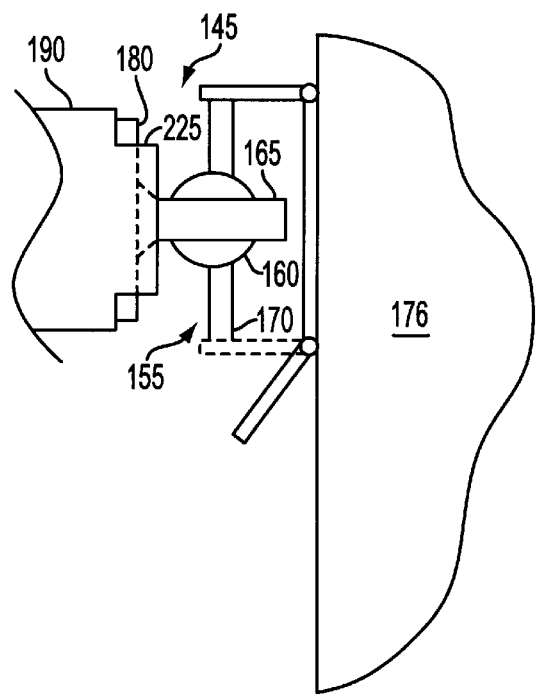
FIG. 14 is a partial view showing another embodiment of a bridge according to the present invention for joining a vehicle to a fixed structure.

The extensible beams 115 join the movable structure 105 to the fixed structure 110 and transversely support the dick members 135 to provide a walkway or deck 140 over which people, vehicles and cargo can be moved. The extensible beams 115 can be joined to the fixed and movable structures 110, 105 by any suitable means which will allow the extensible beams 115 to pivot and to rotate relative to the structures, including, for example, swivel-joints, ball-joints and universal joints. Preferably, the extensible beams 115 are attached by spherical-swivel joints 145 as shown in FIG. 5. Spherical-swivel joints 145 comprise a ball-pin 155 having an integral central-ball-portion 160, and a socket 165 enclosing the central-ball-portion. A pair of pin-portions 170 extend from the central-ball-portion 160 in diametrically opposing directions through openings in the socket 165. Spherical-swivel joints 145 are preferred because they allow the extensible beams 115 to be pivoted up to about 90° from a static position in which extensible beams extends at right angles from the fixed or movable structure 110, 105. Preferably, the spherical-swivel joints allow the extensible beams to rotate up to about 45°, and more preferably up to about 60°. In the version shown, the ball-pin 155 of the swivel joint 145 is attached to the fixed or movable structure 110, 105, by a bracket 175, and the socket 165 attached to the end of the extensible beam 115, however, these relative positions can be reversed without affecting the functioning of the bridge 100. In another version shown in FIGS. 13 and 14, the movable structure 105 is a vehicle 176, such as an automobile, a watercraft, an aircraft, or a spacecraft, and the first or second ends 125, 130, of each of the extensible beams 115 are releasably attached to the vehicle or to the fixed structure 110. The first or second ends 125, 130, can be releasably attached, for example, by providing ball-pins 155 in which the pin-portions 170 are removable, as shown in FIG. 13. Alternatively, the brackets 175 themselves can be removable or otherwise slotted or hinged, as shown in FIG. 14, to allow releasing the ball-pins 155 from the brackets.

Figure 15:
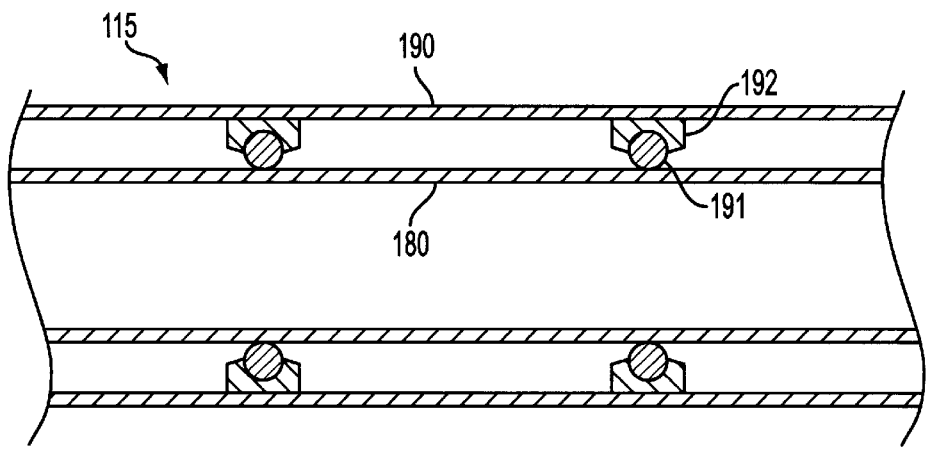
FIG. 15 is a partial sectional view showing an embodiment of an extensible beam having ball-bearings held in circular races disposed between first and second beam members according to the present invention.
Figure 16:
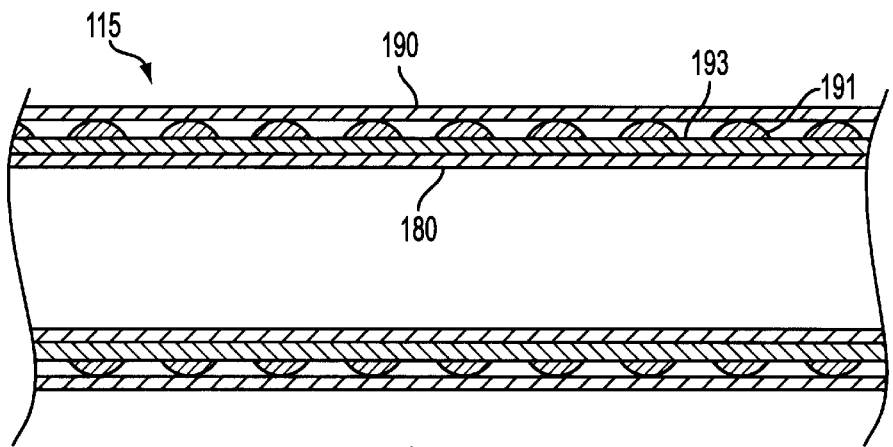
FIG. 16 is a partial sectional view showing an embodiment of an extensible beam having ball-bearings held in linear races disposed between first and second beam members according to the present invention.
Figure 17:
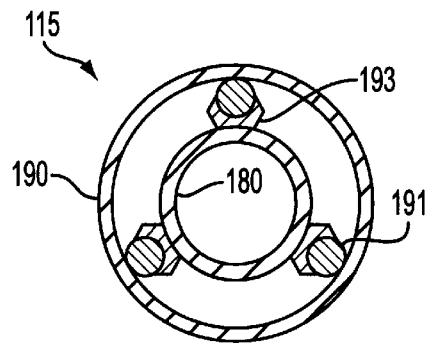
FIG. 17 is another partial sectional view of the embodiment of the extensible beam of FIG. 16 showing radial positioning of the linear races.

Each of the extensible beams 115 comprises a first beam member 180 in slidable engagement with a second beam member 190. The beam members 180, 190, can comprise circular, oval or polygonal cross-section. In one preferred embodiment, the first and second beam members 180, 190, comprise cylinders having complementary diameters so that the first beam member telescopes into the second beam member. This embodiment is preferred because the first and second beam members 180, 190, are in slidable and rotatable engagement. More preferably, in the static or non-extended position the first member 180 is substantially entirely covered by the second member 190 such that all of the deck members 135 are supported on the second member 190. Optionally, a plurality of ball-bearings 191 are disposed inside the second beam member 190 in between the first beam member 180 and the second beam member to ease the extension of the extensible beam 115. The ball-bearings 191 can be held in a number of annular or circular races 192 spaced apart along the longitudinal axis of the extensible beam 115, as shown in FIG. 15, or in a number of linear races 193 spaced radially apart, as shown in FIGS. 16 and 17. In both embodiments, the races 192, 193, can be fixed to either an inner surface 194 of the second beam member 190 or an outer surface 196 of the first beam member 180. As shown in FIG. 5, a sleeve of material 197 having a low coefficient of friction is placed inside the second beam member 190 in between the first beam member 180 and the second beam member. Suitable low friction material includes, for example, Polytetrafluoroethylene (Teflon®), nylon, Delrin® and ultra high molecular weight polyethylene (UHMW).

The number of the extensible beams 115 the bridge 100 has, as well as their size and the material of which they are made, depends on the loading to which the bridge will be subjected. For example, in the embodiment shown in FIGS. 3 and 4, which is suitable for carrying pedestrian traffic, the bridge 100 comprises a central extensible beam 115a and two outer extensible beams 115b one on either side of the central extensible beam having a length of from about 1 to about 100 feet, and a diameter of from about 0.3 to about 30 inches. The extensible beams 115 can be made of any material having sufficient strength including, for example, plastic, metal and ceramic. Preferably, to provide the requisite strength the extensible beams 115 are made of a metal, such as aluminum, chromium, copper, nickel, steel, stainless steel, tin, zinc or alloys thereof. In addition, the extensible beams 115 can be covered or coated with another material, for example, for corrosion control or for decorative purposes.

The deck members 135 are rotatably and pivotably attached to one of the extensible beams 115 by any suitable means that allows them to pivot and rotate relative to the extensible beam, including, for example, ball-socket-joints, swivel-joints and universal joints. In the embodiment shown in FIG. 4, the deck members are attached by ball-socket-joints 195 to the central extensible beam 115a and in sliding contact with the outer extensible beams 115b. Referring to FIG. 6, the ball-socket-joints 195 comprise a ball 200 and a socket 205 having an opening through which the ball is exposed. In this version, the deck member 135 is attached to the ball 200 using a conventional fastener, such as a bolt threaded into a hole in the ball, and the socket 205 is attached to the extensible beam 115. However, as is readily apparent, these attachments can be reversed without affecting the functioning of the bridge 100.

In the embodiment shown in FIGS. 3 and 4, the deck members 135 comprise planks having a regular polygonal cross-section. However, they can also include a contour, such as a stepped shape (not shown), to enable each deck member to ride partly on top of, or under, the preceding or trailing deck member 135. A resilient material, such as bumpers (not shown) made of Teflon®, nylon, Delrin® or UHMW, or a strip of foam rubber, can be placed or attached between the deck members 135 to dampen noise caused by their movement and to prevent objects from falling through or becoming trapped between the deck members. In addition, the bridge 100 can further comprise an alignment or biasing mechanism to return the deck members 135 to a static position oriented substantially transverse to long axes of the extensible beams 115. As shown in FIGS. 3 and 4, the biasing mechanism can comprise, for example, a spring 185 having a first end attached to one of the deck members 135 and a second end attached to one of the extensible beams 115b.

The deck members 135 can be constructed of any material having a suitable strength and flexibility, including wood, metal, plastic, reinforced fiberglass, ceramic, masonry or combinations thereof. Preferably, to provide the requisite strength and minimize weight the deck members 135 are made of a metal such as aluminum, chromium, copper, nickel, steel, stainless steel, zinc or alloys thereof. In addition, the deck members 135 can be can be covered or coated with another material for decorative or functional purposes, for example, a layer of a non-skid polymer can be applied to an upper surface of the deck members to prevent people from slipping on the deck members 135. Alternatively, the deck members 135 themselves can be formed to provide a non-skid surface, for example, they can be made of an expanded metal in which edges of openings formed in the metal provide a non-skid surface. This version is also useful for applications, such as in a marine environment, in which it is desirable to remove water from the deck 140 of the bridge 100.

As shown in FIGS. 3 and 4, the bridge 100 can further include a plurality of fingers 210 attached to the deck members 135 closest to the fixed structure 110 or the moving structure 105 to cover any gap that may open therebetween. The fingers 210 may be made of the same material as the deck members 135 and are attached to the deck members by hinges 215 and in sliding contact with the movable structure 105 and the fixed structure 110. In an alternative embodiment (not shown), the fingers 210 are attached by hinges to one or both of the fixed or moving structures 110, 105, and in sliding contact with the deck members 135. The number and width of the fingers 210 depend on the width of the bridge 100 and the maximum degree or torsional or twisting movement to which it will be subjected. For example, in an embodiment suitable for carrying pedestrian traffic, the bridge 100 comprises from 1 to about 100 fingers 210, each having a width of from about 3 to about 12 inches. The number and width of fingers 210 attached to each end of the bridge 100 need not be the same. For example, because the end of the bridge attached to the fixed structure 110 is subject to less movement, fewer and wider fingers 210 can be attached at this end. The length of the fingers 210 depend on the size of the gap that can open between the deck members 135 and the fixed structure 110 or the moving structure 105. Generally, the fingers 210 comprise a length from about 4 to about 48 inches. Optionally, the fingers 210 are not flat but are bent at an angle of from about 3° to about 10° relative to the surface of the deck 140 to form a ramp to ease movement of wheeled vehicles across the bridge 100.

The bridge 100 can further include a plurality of pads 220 of material having a low coefficient of friction between the deck member 135 and the extensible beams 115. The pads 220 ease the movement of the deck members 135 over the extensible beams 115. Suitable low friction material includes, for example, Teflon®, nylon, Delrin® and UHMW.

The exact number of pads 220 depends on the number of deck members 135 and extensible beams 115. In the bridge 100 shown in FIGS. 3 and 4, for example, there are three pads associated with each deck member. A first pad (center pad 220a) in the center of the deck member 135 and two other pads (outer pads 220b) near the outer ends. The outer pads 220b are fixed in place using a conventional adhesive, a fastener or both. The center pad 220a is held in place by passing the ball-socket-joint 195 through a hole or slot (not shown) in their center. The center pads 220a have an arced lower surface (not shown) which conforms to the central extensible beam 115a to facilitate the pivoting of the deck members 135 about the central extensible beam, and a substantially flat upper surface that allows the deck members to rotate relative to the beam and the pad.

The outer pads 220b are contoured or shaped to allow the deck members 135 to move freely across the surface of the extensible beams 115 substantially without coming out of engagement with the outer extensible beams 115b. In particular, the outer pads 220b are sized and shaped to allow the deck members 135 to move freely relative the outer extensible beams 115b as they rotate and, because (as explained below) the distance separating the outer extensible beams from the center extensible beam 115a can change, to allow the outer extensible beams to move relative to ends of the deck member. The outer pads 220b comprise a square block or tile of low friction material having a flat upper surface secured to the deck member 135, and a lower surface with a raised central portion and two angled portions, one on either side of the central portion. The central portion extends between opposing sides of the pad 220b, and is oriented substantially parallel to a long axis of the deck member 135. The angled portions slope away from the raised central portion toward the deck member 135 at an angle which is selected depending upon the application for which the bridge 100 will be used. Generally, the larger the degree of movement to which the bridge 100 will be subjected, the larger the angle. In addition, the outer pads 220b on deck members 135 closest to the fixed structure 110 or the moving structure 105 can have a contour adapted to allow a full range of movement for these deck members. In one embodiment, the these outer pads 220b on deck members 135 closest to the ends of the bridge 100 further include a cut-out or step which enables them to extend partially over the brackets 175, thereby allowing a full range of movement for the deck members 135 closest to the ends. Optionally, the extensible beams 115 include tabs 225 at either end to provide a surface over which the pads 220 on deck members 135 closest to the fixed structure 110 or the moving structure 105 can move. Generally, the tabs 225 comprise extensions of the upper surface of the second members 190 of the extensible beams 115.

Figure 8:
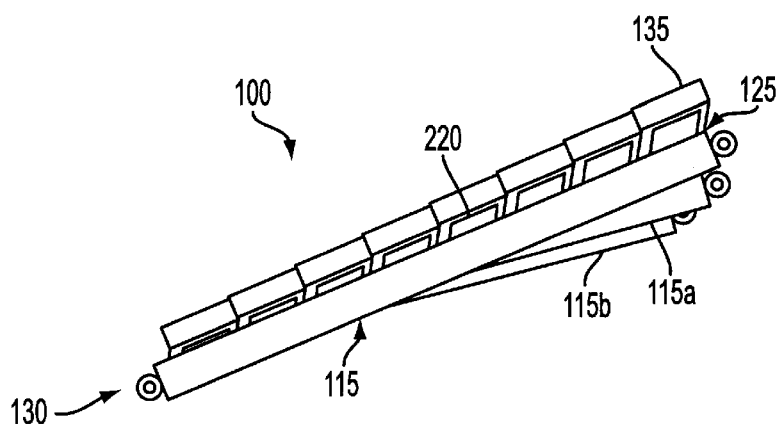
FIG. 8 is a side view of an embodiment of a bridge according to the present invention showing movement of one end of the bridge.

The operation of the bridge 100 will now be described with reference to FIGS. 7a to 7e and FIG. 8. FIGS. 7a to 7e are a series of schematic illustrations of the end of the bridge 100 that is attached to the movable structure 105. It should be noted that the other end of the bridge 100, which is attached to the fixed structure 110, remains in a position similar to that shown in FIG. 7c. However, for clarity, and to avoid overlap of the FIGS. 7a to 7e, the bridge 100 is not shown in perspective. As the movable structure 105 is rotated about an axis parallel to that of the bridge 100 (pitching motion), the first ends 125 of the extensible beams 115, which are attached to the movable structure, are raised (FIGS. 7c to 7a) or lowered (FIGS. 7c to 7e) causing the extensible beams 115 to rotate slightly. The movement also causes the deck members 135 to pivot on the ball-socket-joint 195 about the central extensible beam 115a, and contact point between the deck members 135 and the extensible beams 115 to shift. Because the second ends 130 of the extensible beams 115 remain attached to the fixed structure 110, as shown in FIG. 8, the extensible beams 115 extend as their first ends 125 are moved from the static horizontal position. Moreover, because the range of the movement is greater for the extensible beam 115b furthest from the axis of rotation it is extended further than the others. Thus, the extensible beams 115, if they were parallel to one another in the static horizontal position, do not remain so. Finally, although not shown in these figures, because the second end 130 of the bridge 100 remains attached to the fixed structure 110, the magnitude of the movement of the extensible beams 115 and the deck members 135 is not constant across the bridge but decreases as the fixed structure is approached.

Figure 9:
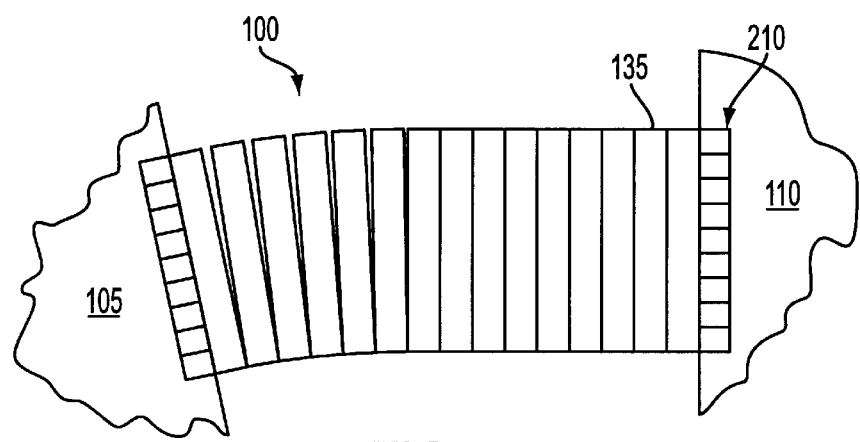
FIG. 9 is a top view of an embodiment of a bridge according to the present invention showing movement of the bridge in response to yawing motion of a movable structure attached to the bridge.
Figure 10:
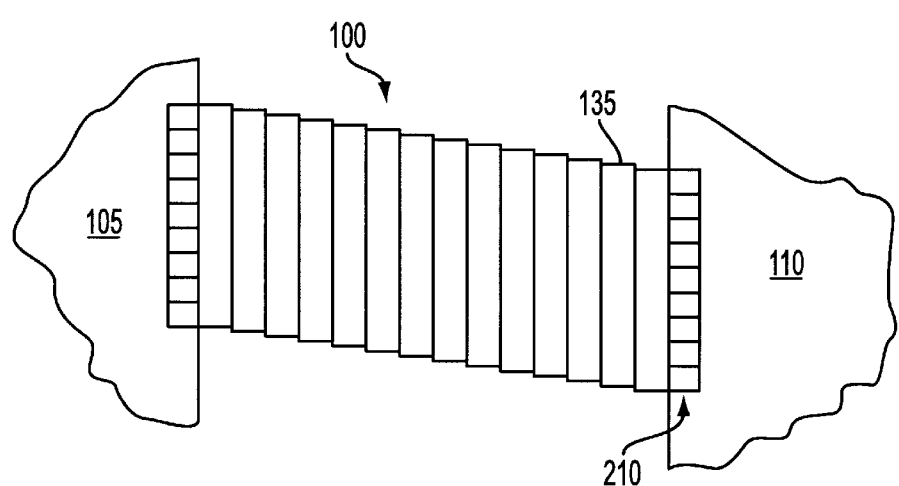
FIG. 10 is a top view of an embodiment of a bridge according to the present invention showing movement of the bridge in response to longitudinal motion of a movable structure attached to the bridge.

FIG. 9 and FIG. 10 are top views of a bridge 100 attached to a movable structure 105 and a fixed structure 110 showing, respectively, movement of the bridge 100 in response to rotation of the movable structure 105 about an axis perpendicular to the bridge 100 (yawing motion) and longitudinal movement. It will be appreciated that any of these motions, as well as others which are not illustrated including roll, vertical movement and lateral movement (towards or away from the fixed structure 110), can be combined to produce complex motions that necessitate substantial and rapid realignment of the bridge 100.

Figure 11:
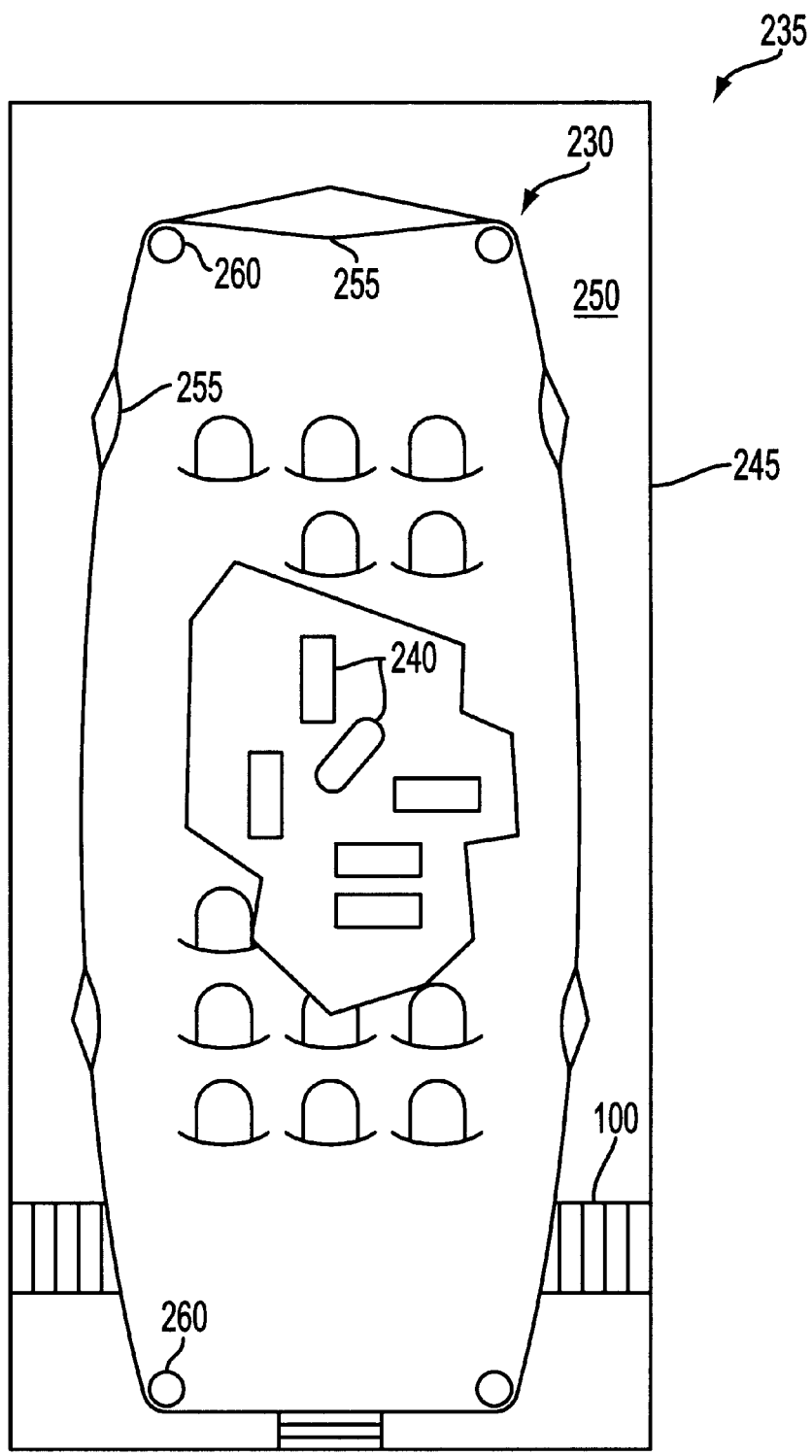
FIG. 11 is a top view of an embodiment of theater comprising a motion-base and a bridge according to the present invention.

The bridge 100 of the present invention is particularly useful for joining a motion-base 230 to a fixed structure 110, for example as in a moving theater 235 as shown in FIG. 11. Referring to FIG. 11, the theater 235 generally includes a motion-base 230 supported by a gimbal (not shown) and is moved by plurality of actuators 240 (six are shown) adapted to move the motion-base through six-degree-of-freedom of motion including roll, pitch, yaw, vertical, lateral and longitudinal motion. The actuators 240 can comprise any conventional actuating mechanism including hydraulic, pneumatic, electric or any combination thereof. In the embodiment shown, the theater 235 further comprises an enclosure 245 surrounding the motion-base 230, and one or more bridges 100 according to the present invention joining the enclosure to the motion-base. In this version, the actuators 240 further comprise a number of mechanical stops (not shown) to limit movement of the motion-base 230 to a operating envelop 250 within the enclosure 245. Typically, the theater 235 also includes one or more screens 255 and speakers 260 for presenting audio and visual information to patrons seated in the theater. As the presentation proceeds the motion-base 230 is moved in various directions as described above. Preferably, to simulate riding in a particular type of vehicle the movement of the motion-base 230 is controlled to synchronize it with the audio and visual information presented.

Figure 12:
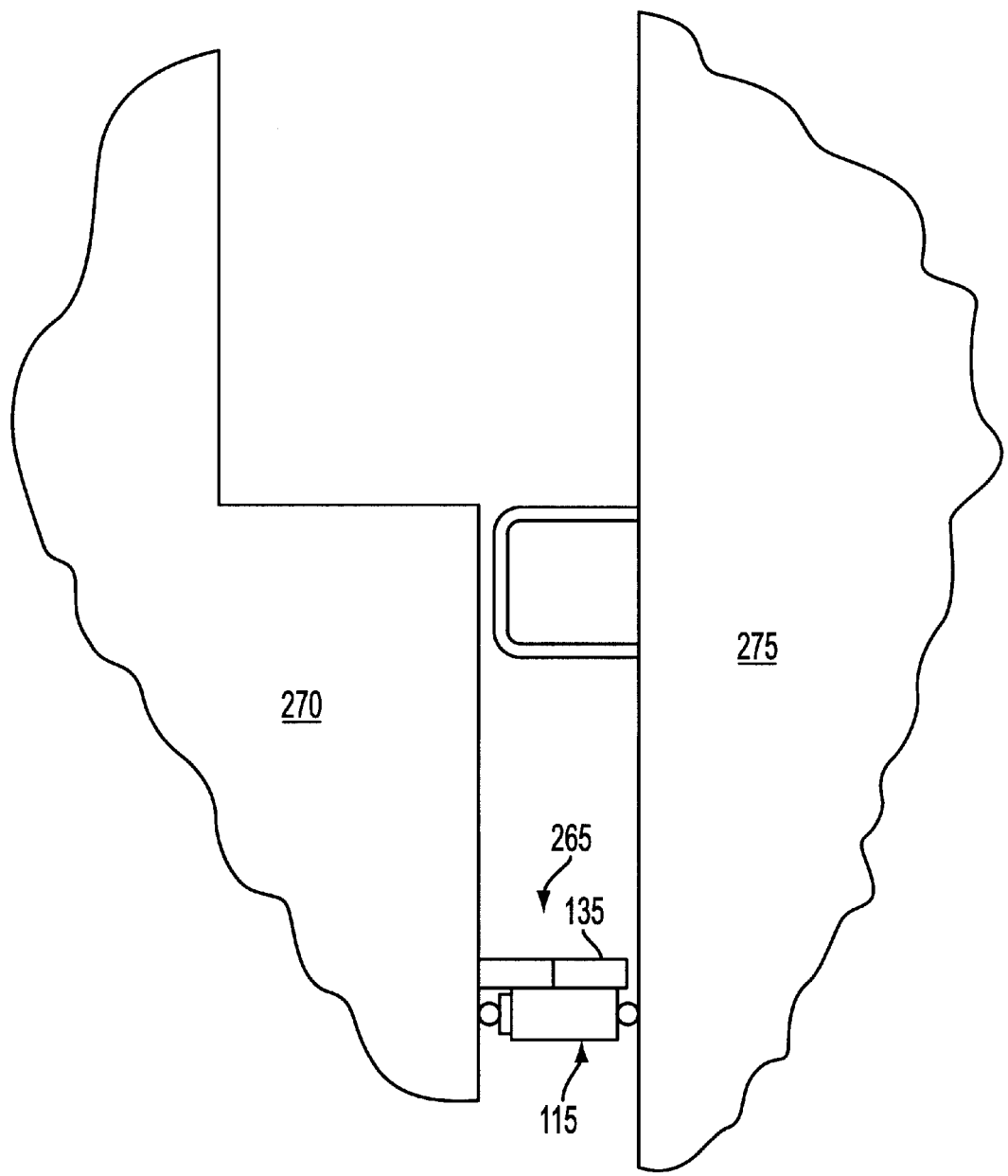
FIG. 12 is a side view of an embodiment of a bridge according to the present invention for joining a first substantially fixed structure to a second substantially fixed structure.

In another aspect, shown in FIG. 12, the present invention is also useful as a bridge 265 for joining first and second substantially fixed structures 270, 275, such as joining separate buildings or two portions of the same building. The bridge 265 generally includes a number of spaced apart extensible beams 115 pivotably and rotatably attached to the first structure 270 and to the second structure 275. The bridge 265 can further include one or more deck members 135 supported above and by the extensible beams 115 in a substantially horizontal attitude. Preferably, each of the deck members 135 is pivotably and rotatably attached to one of the extensible beams 115 to provide access between the first and second structures 270, 275. More preferably, the bridge 265 joins the first and second structures 270, 275, while enabling movement of the first structure 270 relative to the second structure 275 due to thermal expansion, seismic forces, or wind. FIG. 12 illustrates joining a first building 270, such as a parking structure, to a second building 275, such as an office building, using an bridge 265 according to the present invention. However, it will be readily appreciated that properly scaled versions of the bridge 265 can be used to provide access between marina structures, such as floating piers, or a ship to shore passageway.

It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. Although the preferred embodiment described herein is directed to a bridge for use with a motion-base 230 in a theater 235, it will be appreciated by those skilled in the art that the teachings of the present invention can be applied to other applications such as in amusement rides and for joining vehicles to each other or to stationary structures, without departing from the scope and spirit of the present invention. For example, a bridge 100 according to the present invention can be used to provide access for passengers between moving or stationary attached rail cars.

What is claimed is:

1. A bridge for joining a movable structure to a fixed structure, the bridge comprising:
   (a) a plurality of spaced apart extensible beams, each extensible beam having a first end pivotably and rotatably attached by a spherical-swivel-joint to the movable structure and a second end pivotably and rotatably attached by a spherical-swivel-joint to the fixed structure; and
   (b) a plurality of deck members supported by the plurality of extensible beams in a substantially horizontal attitude, each of the plurality of deck members pivotably and rotatably attached by a ball-socket-joint to one of the plurality of extensible beams, said plurality of deck members providing access between the movable structure from the fixed structure.

2. A bridge according to claim 1 wherein the movable structure comprises a motion-base.

3. A bridge according to claim 1 wherein the movable structure comprises a vehicle, and wherein the first ends of each of the plurality of extensible beams are releasably attached to the vehicle.

4. A bridge according to claim 3 wherein the vehicle is selected from a group consisting of:
   (a) trains;
   (b) automobiles;

(c) watercraft;

(d) aircraft; and (e) spacecraft.

5. A bridge for joining a motion-base to a fixed structure, the bridge comprising:

(a) three spaced apart extensible beams including a central extensible beam and two outer extensible beams, one on each side of the central extensible beam, each extensible beam having a first end pivotably and rotatably attached by a spherical-swivel-joint to the motion-base and a second end pivotably and rotatably attached by a spherical-swivel-joint to the fixed structure; and (b) a plurality of deck members supported by the extensible beams in a substantially horizontal attitude, each of the plurality of deck members pivotably and rotatably attached by a ball-socket-joint to the central extensible beam and in sliding contact with the outer extensible beams, said plurality of deck members providing access between the motion-base from the fixed structure.

6. A bridge according to claim 5 wherein each of the plurality of deck members further comprises a plurality of pads of material having a low coefficient of friction between the deck member and the extensible beams.

7. A bridge according to claim 5 wherein each of the extensible beams comprises a first beam member in slidable engagement with a second beam member.

8. A bridge according to claim 7 wherein the first beam member telescopes into the second beam member.

9. A bridge according to claim 8 wherein each of the extensible beams further comprises a plurality of ball-bearings inside of the second beam member and between the first beam member and the second beam member to ease the telescoping of the first member into the second beam member.

10. A bridge according to claim 8 wherein each of the extensible beams further comprises a sleeve of material having a low coefficient of friction inside of the second beam member and between the first beam member and the second beam member to ease the telescoping of the first member into the second beam member.

11. A bridge according to claim 8 wherein the first beam member is in rotatable engagement with the second beam member.

12. A bridge according to claim 5 further comprising a spring adapted to return the plurality of deck members to a static position oriented substantially transverse to long axes of the plurality of extensible beams, the spring having a first end attached to one of the plurality of deck members and a second end attached to one of the extensible beams.

13. A bridge according to claim 5 further comprising a plurality of fingers attached to the deck members closest to the motion-base and the fixed structure.

14. A method of joining a movable structure to a fixed structure, the method comprising steps of:

(a) providing a plurality of extensible beams having first ends and second ends;

(b) pivotably and rotatably attaching the first ends of the plurality of extensible beams to the movable structure using spherical-swivel-joints, and pivotably and rotatably attaching the second ends to the fixed structure using spherical-swivel-joints;

(c) pivotably and rotatably attaching a plurality of deck members to one of the plurality of extensible beams using ball-socket-joints so that the deck is supported by plurality of extensible beams in a substantially horizontal attitude, said plurality of deck members providing access to the movable structure while enabling movement of the movable structure relative to the fixed structure.

15. A method according to claim 14 wherein step (b) comprises the step of attaching the plurality of extensible beams to the movable structure and the fixed structure to provide a central extensible beam and two outer extensible beams, one on each side of the central extensible beam.

16. A method according to claim 15 wherein step (c) comprises the step of pivotably and rotatably attaching each of the plurality of deck members to the central extensible beam.

17. A theater comprising:

(a) a motion-base comprising a plurality of actuators to move the motion-base through six degrees of freedom of motion; and (b) a bridge comprising a plurality of spaced apart extensible beams, each extensible beam having a first end pivotably and rotatably attached by a spherical-swivel-joint to the motion-base and a second end pivotably and rotatably attached by a spherical-swivel-joint to a fixed structure, and a plurality of deck members supported by the plurality of extensible beams in a substantially horizontal attitude, each of the plurality of deck members pivotably and rotatably attached by a ball-socket-joint to one of the plurality of extensible beams, said plurality of deck members providing access to the motion-base from the fixed structure while enabling movement of the motion-base relative to the fixed structure.

18. A theater according to claim 17 wherein the plurality of spaced apart extensible beams comprises three spaced apart extensible beams including a central extensible beam and two outer extensible beams, one on each side of the central extensible beam.

19. A theater according to claim 18 wherein each of the plurality of deck members pivotably and rotatably attached to the central extensible beam and in sliding contact with the outer extensible beams.

20. A bridge for joining a first structure to a second structure, the bridge comprising:

(a) a plurality of spaced apart extensible beams, each extensible beam having a first end pivotably and rotatably attached by a spherical-swivel-joint to the first structure and a second end pivotably and rotatably attached by a spherical-swivel-joint to the second structure; and (b) a plurality of deck members supported by the plurality of extensible beams in a substantially horizontal attitude, each of the plurality of deck members pivotably and rotatably attached by a ball-socket-joint to one of the plurality of extensible beams so that the first structure is joined to the second structure while enabling movement of the first structure relative to the second structure.

21. A bridge according to claim 20 wherein the first structure and the second structure comprise adjacent buildings.

22. A bridge according to claim 21 wherein the movement of the first structure relative to the second structure is due to thermal expansion, seismic forces, or wind.

23. A bridge according to claim 20 wherein the first structure and the second structure comprise movable structures.

\* \* \* \* \*